(12) United States Patent
Jin

(10) Patent No.: US 9,696,869 B2
(45) Date of Patent: Jul. 4, 2017

(54) MOBILE TERMINAL AND CONTROL METHOD THEREOF

(75) Inventor: Hyungjun Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 13/598,865

(22) Filed: Aug. 30, 2012

(65) Prior Publication Data

US 2013/0067389 A1 Mar. 14, 2013

(30) Foreign Application Priority Data

Sep. 9, 2011 (KR) .......................... 10-2011-0092239

(51) Int. Cl.
*G06F 3/0481* (2013.01)
*G06F 3/0482* (2013.01)
*G06F 3/0486* (2013.01)
*G06F 3/0488* (2013.01)

(52) U.S. Cl.
CPC ........ *G06F 3/04817* (2013.01); *G06F 3/0482* (2013.01); *G06F 3/0486* (2013.01); *G06F 3/04886* (2013.01); *G06F 2203/04803* (2013.01)

(58) Field of Classification Search
CPC ........... G06F 2203/04803; G06F 3/017; G06F 3/0485; G06F 3/0486
USPC ................................ 715/783, 781, 800, 786
See application file for complete search history.

(56) References Cited

U.S. PATENT DOCUMENTS

| 7,555,725 B2* | 6/2009 | Abramson | G01C 21/367 701/532 |
| 7,739,604 B1* | 6/2010 | Lyons et al. | 715/736 |
| 2006/0178827 A1* | 8/2006 | Aoyama | G01C 21/3664 701/432 |
| 2010/0088634 A1* | 4/2010 | Tsuruta | G06F 3/0488 715/800 |
| 2010/0293508 A1* | 11/2010 | Hwang | G06F 3/04886 715/846 |
| 2011/0113445 A1* | 5/2011 | Lee | G06F 17/30696 725/37 |
| 2011/0161861 A1 | 6/2011 | Abramson et al. | |

(Continued)

FOREIGN PATENT DOCUMENTS

CN 1431826 A 7/2003
CN 101539833 A 9/2009

(Continued)

OTHER PUBLICATIONS

"Designing Aero Snap" (Steven Sinofsky Mar. 17, 2009 ©; pp. 1-16).*

(Continued)

*Primary Examiner* — Sherrod Keaton
(74) *Attorney, Agent, or Firm* — KED & Associates LLP

(57) ABSTRACT

In a mobile terminal and a control method thereof, the mobile terminal includes a display unit configured to display a plurality of objects, a detector configured to detect information associated with an object selected by a user from the plurality of objects, and a controller configured to generate a second display window when the user selects at least one of the plurality of objects, the second display window being separate from a first display window for displaying the plurality of objects, and output information detected by the detector on the generated second display window.

12 Claims, 18 Drawing Sheets

(56) References Cited

U.S. PATENT DOCUMENTS

2012/0131497 A1* 5/2012 Jitkoff .................. G06F 3/0481
715/786
2013/0332881 A1 12/2013 Yook et al.

FOREIGN PATENT DOCUMENTS

| CN | 101751566 A | 6/2010 |
| CN | 102129345 A | 7/2011 |
| EP | 2 076 000 A2 | 7/2009 |
| EP | 2 128 748 A2 | 12/2009 |
| KR | 10-2010-0107377 | 10/2010 |

OTHER PUBLICATIONS

European Search Report dated Jan. 4, 2016 issued in Application No. 12 00 6326.8.

\* cited by examiner

MOBILE TERMINAL AND CONTROL METHOD THEREOF

CROSS-REFERENCE TO RELATED APPLICATION(S)

Pursuant to 35 U.S.C. §119(a), this application claims the benefit of earlier filing date and right of priority to Korean Application No. 10-2011-0092239, filed on Sep. 9, 2011, the contents of which is incorporated by reference herein in its entirety.

BACKGROUND

1. Field

This specification relates to a mobile terminal capable of dividing a screen, and a control method thereof.

2. Background

As a mobile terminal becomes multifunctional, the mobile terminal can be allowed to perform various functions, such as supporting data and voice communication, capturing still images or moving images through a camera, storing (recording) voice, playing music files through a speaker system, displaying an image or video and the like. Some of mobile terminals may include an additional function for playing games while others may be implemented as a multimedia player. In recent time, the mobile terminal may be allowed to receive a broadcast or multicast signal so as to enable watching of video or television programs.

Furthermore, many efforts are undergoing to support or enhance various functions of such mobile terminals. Such many efforts include not only changes and improvement of structural components implementing a mobile terminal but also software or hardware improvement.

As a variety of tasks, such as writing documents, checking e-mails, editing photos and the like, are allowed by use of the mobile terminal, a quantity of data to be displayed on a display unit is increasing.

Therefore, a method for efficiently outputting data on a display unit with a limited size is considered.

SUMMARY OF THE INVENTION

Therefore, an aspect of the detailed description is to provide a mobile terminal capable of efficiently displaying associated data, and a control method thereof.

To achieve these and other advantages and in accordance with the purpose of this specification, as embodied and broadly described herein, there is provided a mobile terminal including a display unit configured to display a plurality of objects, a detector configured to detect information associated with an object selected by a user from the plurality of objects, and a controller configured to generate a second display window when the user selects at least one of the plurality of objects, the second display window being separate from a first display window for displaying the plurality of objects, and output information detected by the detector on the generated second display window.

In accordance with one aspect, the display unit may display a control window for controlling at least one of the first and second display windows.

In accordance with one aspect, when a control command is generated through the control window, the controller may process the generated control command on one display window, on which the last control command has been input, of the first and second display windows.

In accordance with one aspect, the mobile terminal may further include a sensor configured to sense an orientation that the display unit is inclined, and the controller may set a position of the control window using the inclination of the display unit.

In accordance with one aspect, the control window may be displayed on an area corresponding to the inclination-sensed orientation.

In accordance with one aspect, the position where the control window is displayed may change when the orientation that the display unit is inclined changes.

In accordance with one aspect, the first display window may be updated in cooperation with a control command input on the second display window.

In accordance with one aspect, when one of information displayed on the second display window is selected by the user, the controller may convert the first display window so that contents displayed on the first display window can be associated with the selected information.

In accordance with one aspect, the second display window may be generated when a touch input is sensed on at least one of the objects displayed on the first display window and a dragging input consecutive to the sensed touch input is sensed more than a preset range out of the first display window.

In accordance with one aspect, the second display window may become invisible when the touch input is sensed on the second display window and a dragging input consecutive to the sensed touch input is sensed over a preset range out of the second display window.

In accordance with one aspect, the second display window may be generated on an area corresponding to a direction of the dragging input.

In accordance with one aspect, when at least one of the plurality of objects is selected, the controller may display a select window to allow the user to determine whether to generate the second display window.

In accordance with one aspect, the generation of the second display window may be subject to the detection of the information associated with the selected object.

In accordance with one aspect, objects associated with a map may be displayed on the first display window, and when one of the objects is selected on the first display window, adjacent area information associated with the selected object may be output on the second display window.

In accordance with one aspect, the area information may include an address, and when one of the area information output on the second display window is selected, the first display window may be updated to display a detailed map corresponding to the address included in the selected area information.

To achieve these and other advantages and in accordance with the purpose of this specification, as embodied and broadly described herein, there is provided a method for controlling a mobile terminal having a display unit to display a plurality of objects, the method including detecting information associated with at least one object when the at least one object is selected by a user from the plurality of objects, generating a second display window in response to the selection, the second display window being separate from the a first display window for displaying the plurality of objects, and displaying the detected associated information on the second display window.

In accordance with one aspect, at the step of generating the second display window, a control window for controlling at least one of the first and second display windows may be displayed in response to an orientation that the display unit is inclined.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The embodiments will be described in detail with reference to the following drawings in which like reference numerals refer to like elements wherein.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described in this specification may include cellular phones, smart phones, laptop computers, digital broadcasting terminals, personal digital assistants (PDAs), portable multimedia players (PMPs), navigators, and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
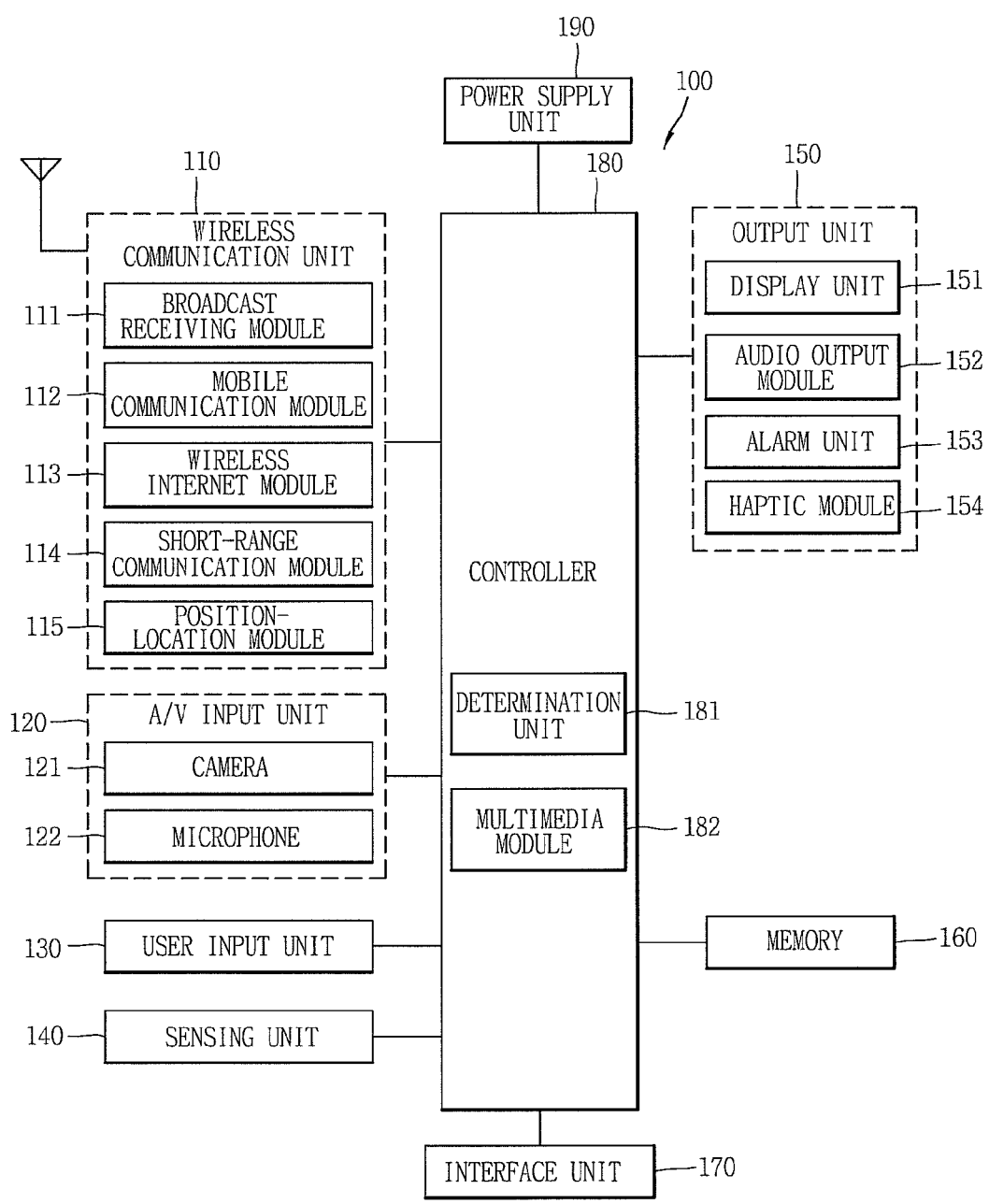
FIG. 1 is a block diagram of a mobile terminal in accordance with one exemplary embodiment.

FIG. 1 is a block diagram of a mobile terminal 100 in accordance with one exemplary embodiment.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 182 which provides multimedia playback. The multimedia module 182 may be configured as part of the controller 180 or as a separate component.

The controller 180 can perform a pattern recognition processing so as to recognize writing or drawing input on the touch screen as text or image.

Also, the controller 180 may execute a lock state, in which a user is restricted from inputting a control command for applications, when a state of the mobile terminal satisfies a preset condition. The controller 180 may control a lock screen, which is displayed in the lock state, based upon a touch input detected on the display unit 151 (hereinafter, referred to 'touch screen') in the lock state.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Hereinafter, description will be given of components provided in the mobile terminal in accordance with the exemplary embodiment shown in FIG. 1.

Figure 2A:
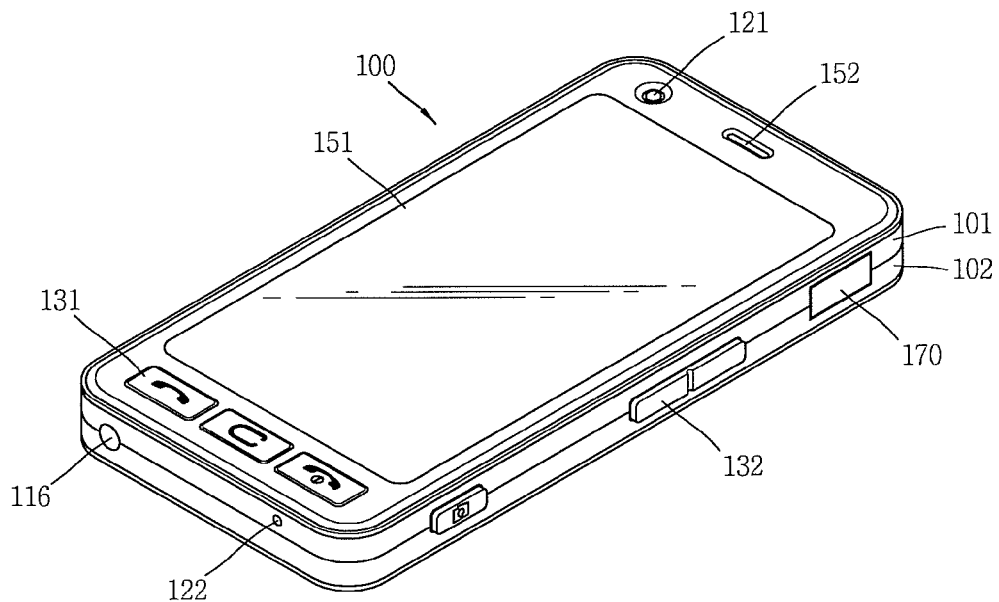
FIG. 2A is a front perspective view showing an example of the mobile terminal.
Figure 2B:
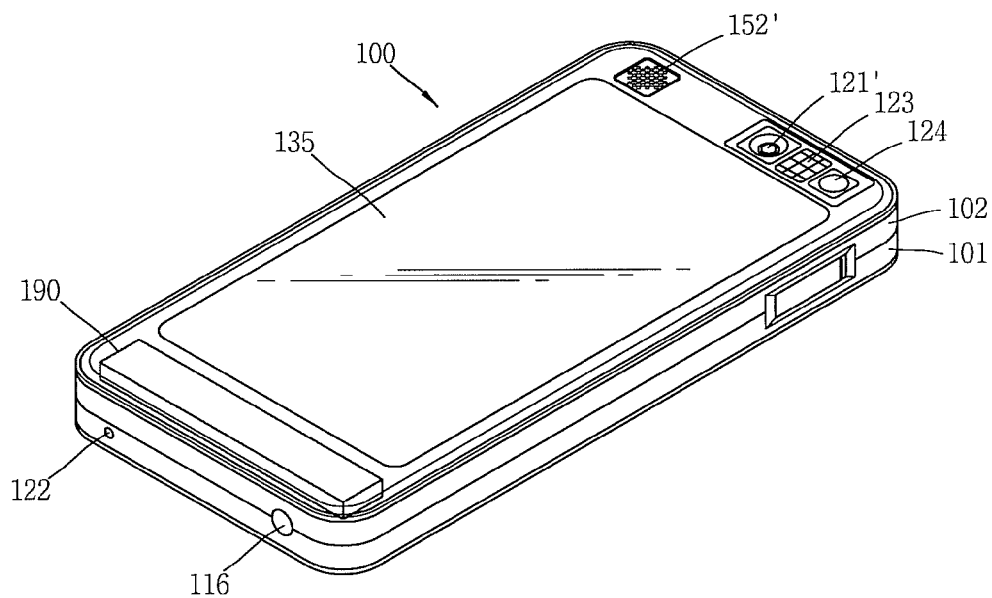
FIG. 2B is a rear perspective views of the mobile terminal of FIG. 2A.

FIG. 2A is a front perspective view showing an example of the mobile terminal, and FIG. 2B is a rear perspective of the mobile terminal of FIG. 2A.

The mobile terminal 100 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

As shown in FIGS. 2A and 2B, a terminal main body (hereinafter, referred to as 'body') 100 may include a front surface, side surfaces and a rear surface. Also, the body may have both ends formed in a lengthwise direction.

A body may include a case (or referred to as casing, housing, cover, etc.) defining an appearance of the mobile terminal 100. In this exemplary embodiment, the case may be divided into a front case 101 and a rear case 102. A space formed between the front and rear cases 101 and 102 may accommodate various electronic components. At least one intermediate case may further be disposed between the front and the rear cases 101 and 102.

Such cases may be injected using a synthetic resin or be formed of a metal, such as stainless steel (STS), titanium (Ti) or the like.

The terminal body is shown having a display unit 151, an audio output module 152, a camera 121, a user input unit 130/131, 132, a microphone 122, an interface unit 170, and the like.

The display unit 151 may occupy most of a principal surface of the front case 101. The audio output module 152 and the camera 121 may be disposed near one of both end portions of the display unit 151, and the user input unit 131 and the microphone 122 on the other end portion of the display unit 151. The user input unit 131, the interface unit 170 and the like may be disposed on side surfaces of the front and rear cases 101 and 102. The microphone 122 may be disposed on the other end of the body 100.

The user input unit 130 may be manipulated to allow inputting of commands for controlling operations of the mobile terminal 100, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display module 210 into a touch recognition mode, or the like.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display module 210 into a touch recognition mode, or the like.

Referring to FIG. 2B, an audio output module 152' may further be disposed at a rear face of the terminal body, namely, the rear case 102. The audio output module 152' can cooperate with the audio output module 152 (see FIG. 2A) to provide stereo output. Also, the audio output module 152' may be configured to operate as a speakerphone.

The rear case 102 of the terminal body may further be provided with a camera 121'. The camera 121' faces a direction which is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display module 210, the touchpad 135 may be implemented as a light-transmissive type. Here, if the display unit 151 is configured to output visual information from both surfaces, the visual information can be recognized through the touchpad 135. The information output from the both surfaces may all be controlled by the touchpad 135. Unlike to this, a display may further be mounted on the touchpad 135 so as to configure a touch screen even on the rear case 102.

The touchpad 135 may operate mutually in association with the display unit 151 of the front case 101. The touchpad 135 may be provided on the rear of the display unit 151 in parallel to each other. The touchpad 135 may have a size the same as or smaller than the size of the display unit 151.

Also, the controller 180, which may include at least one of the aforementioned components, may divide a display window output on the display unit 151 when at least one of a plurality of objects displayed on the display unit 151 is selected by a user.

That is, the controller 180 may generate a first display window where the plurality of objects are output, and a second display window separate from the first display window, in response to the user selecting an object.

The controller 180 may also control information related to the selected object to be displayed on the generated second display window.

The information displayed on the second display window may be detectable by a detector 181.

As aforementioned, the controller 180 may display information related to objects, which are displayed on the display unit 151, on a separately generated display window, and display information detected by the detector 181 on another separately generated display window, whereby information can be efficiently provided to the user on the display unit 151 with the limited size.

Hereinafter, description will be given of a control method for dividing a screen and displaying information on the divided screens in a mobile terminal in accordance with the present disclosure, with reference to FIGS. 3 and 4.

Figure 3:
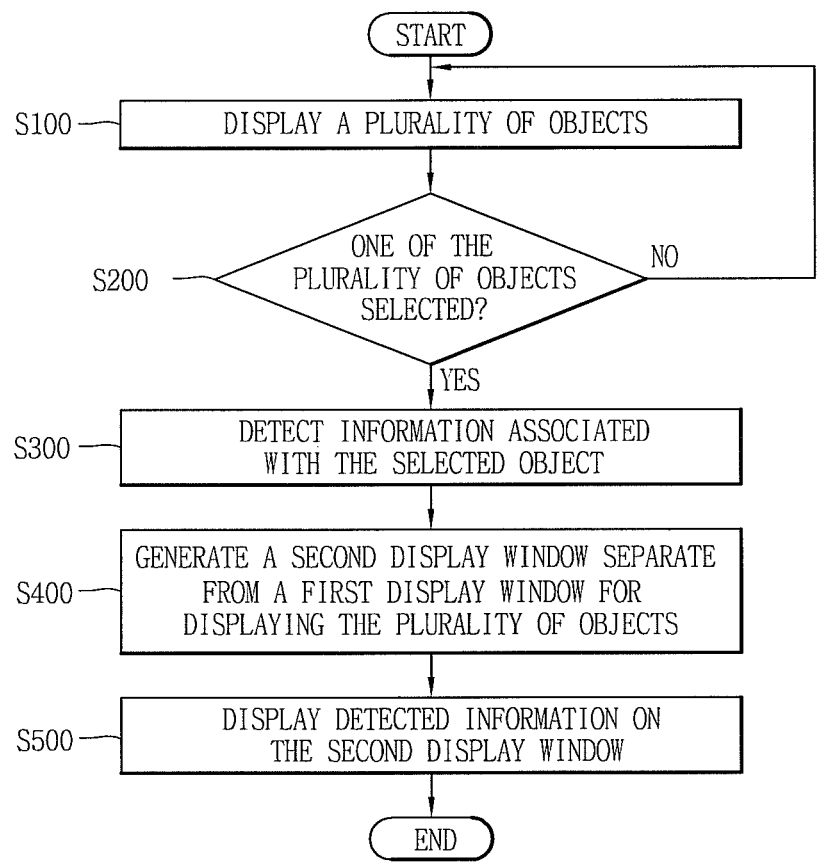
FIG. 3 is a flowchart showing a control method for a mobile terminal in accordance with one exemplary embodiment.
Figure 4:
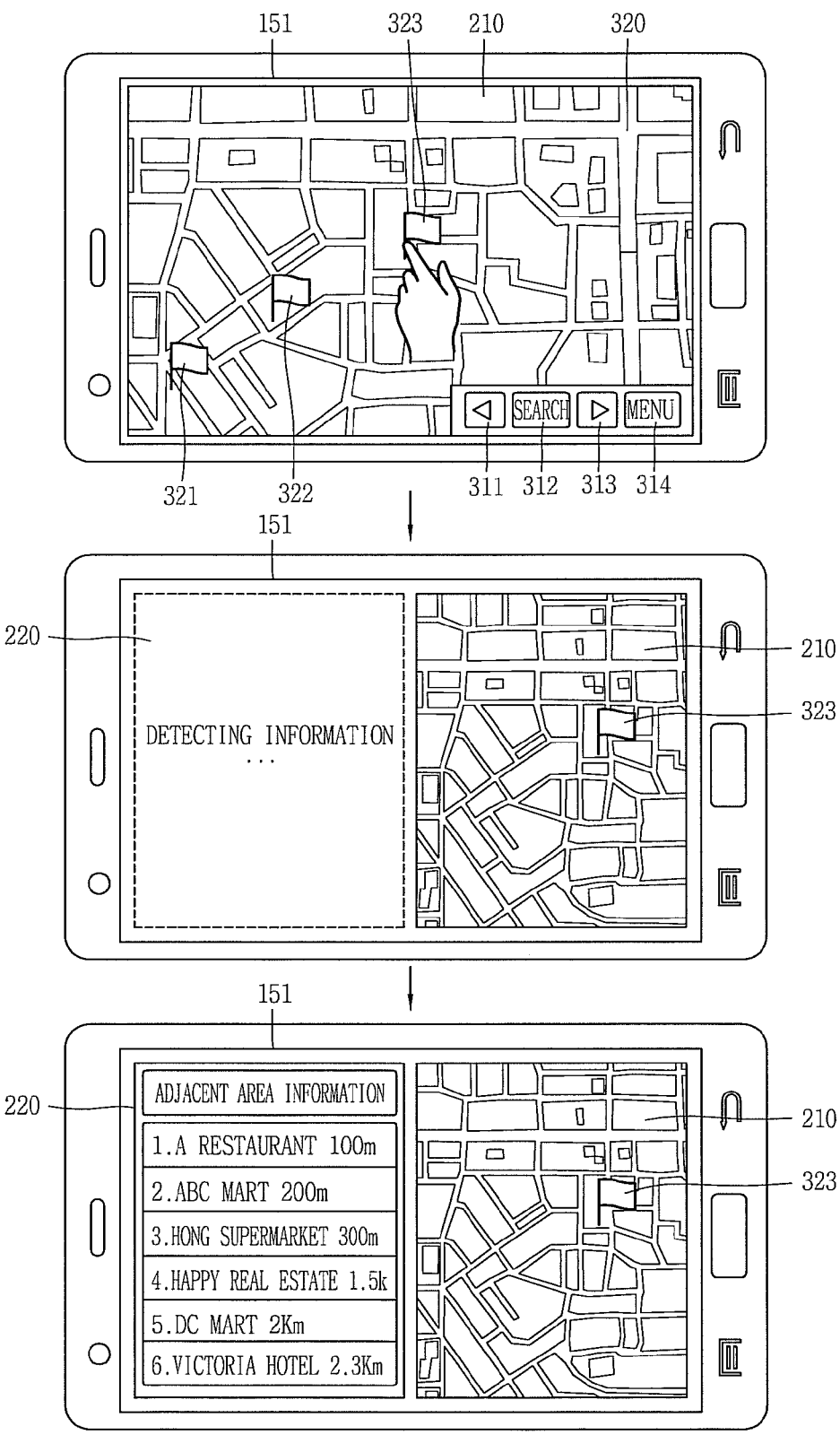
FIG. 4 is an overview showing the control method for the mobile terminal.

FIG. 3 is a flowchart showing a control method for a mobile terminal in accordance with one exemplary embodiment, and FIG. 4 is an overview showing the control method for the mobile terminal.

First, a control method according to the present disclosure may include displaying a plurality of objects on a display unit 151 (S100).

Here, an object may be a target, which is subject to a user's intension or action, for example, image, video, icon, sound, email, posting on Social Network Service (SNS) site, memo, and contents or text of an originated or terminated call or instant message, and the like. In addition to them, various types of virtual keys displayed for control of the mobile terminal may be considered as an object. That is, any object may be available if it is subject to a user's action.

For example, referring to FIG. 4, on a first display window 210 of the display unit 151 may be displayed objects including virtual control keys 311, 312, 313, 314 for the control of the first display window 210, an image corresponding to a map 320, or icons 321, 322, 323 of buildings present on the map 320.

Next, when a user selects at least one of the plurality of objects displayed on the first display window 210 of the display unit 151 (S200), the detector 181 may detect information associated with the selected object (S300).

Here, the step in which the at least one of the objects has been 'selected' by the user, for example, may indicate that an object has been 'selected' when a preset type of touch is input on the display unit 151 which is touch-sensitive.

Also, it may be set to select an object by using a separately display function key. The preset type of touch indicates, for example, 'double touch, single touch, long touch, dragging touch, flicking touch' or the like, or a combination thereof.

For example, when 'long touch (long press)' is given with respect to an object, the controller 180 may recognize that the object has been selected. The type of touch may be variously set by the user or the controller 180.

Also, the controller 180 recognizes that an object has been selected when a preset touch is input, so a touch input for generating another control command and a touch input for selecting an object may be distinguished.

Meanwhile, information detected by the detector 181 may be information associated with the user-selected object. The detector 181 may detect information related to the selected object from a pre-stored database or a database of a website or the like through the wireless communication unit 110.

The 'information associated with the selected object' may not have a specific format but be every type of information having various forms, formats and attributes.

For example, as shown in FIG. 4, when a user selects an area object 323 on the map object 320, the detector 181 analyzes information included in the area object 323. Here, the information included in the area object 323 may be 'address information.' The detector 181 detects associated information included in the analyzed 'address information,' namely, information related to adjacent buildings having different address information associated with the 'address information.'

As another example, when the user selects 'photo' object displayed on the display unit 151, the detector 181 may analyze a person (figure) included in the photo object and provide the analyzed person and information related to the analyzed person, such as phone number, message, originated or terminated history, mail address and the like.

Also, the detector 181 may detect functions associated with the photo, for example, detect functions, such as Photoshop, mail sending and the like.

Thus, the detector 181 may detect all of fact information and function information associated with a selected object.

The range or type of the information detected by the detector 181 may be defined by settings of the user or the controller 180.

Afterwards, the controller 180 may generate a second display window 220, which is separate from the first display window 210 where the plurality of objects are displayed, in response to the user selecting the object (S400).

Here, the second display window 220 may be generated as soon as the information is detected by the detector 181, or generated before or after detection of the information. Hence, the information detection and the generation of the second display window 220 may not be limited to a time sequence in the present disclosure.

Also, the controller 180 may generate more than two display windows according to a quantity or type of information displayed.

Meanwhile, the controller 180 may adjust a size of the first display window 210 such that the generated second display window 220 can be output on the display unit 151 without being overlapped by the first display window 210.

Here, a size of a screen previously displayed on the first display window 210 may be adjusted in response to the size of the first display window 210 being adjusted. For example, a screen for the map 320 displayed on the first display window 210 may be displayed in a size-reduced state.

The sizes of the first and second display windows 210 and 220 displayed on the display unit 151 may vary according to settings of a user or the controller 180.

As aforementioned, as the user selects an object, when information is detected by the detector 181 and the second display window 220 is generated by the controller 180, then the controller 180 may display the information detected by the detector 181 on the second display window 220 (S500).

For example, referring to FIG. 4, when the area object 323 is selected on the first display window 210 and information associated with the area object 323 is detected by the detector 181, the controller 180 may display the detected information on the generated second display window 220, which is separate from the first display window 210.

Hence, the information associated with the area object 323, namely, address information related to the area object 323 and information related to adjacent areas may be displayed on the second display window 220.

Here, the controller 180 may first display information with the highest association with the area object 323, for example, information related to a building or store which is located at the closest position to the selected area object 323.

As mentioned above, according to the mobile terminal and a control method thereof, information associated with an object selected by a user can be detected, which allows the user to obtain various information related to an object in which the user is interested.

Also, according to the mobile terminal and a control method thereof, a display window, which is different from a display window previously displayed on a display unit, may be generated and detected information can be displayed on the generated display window, which may result in an efficient provision of information without burden that the user has to change windows.

Hereinafter, description will be given of cooperative relation between the first display window 210 and the second display window 220.

Figure 5A:
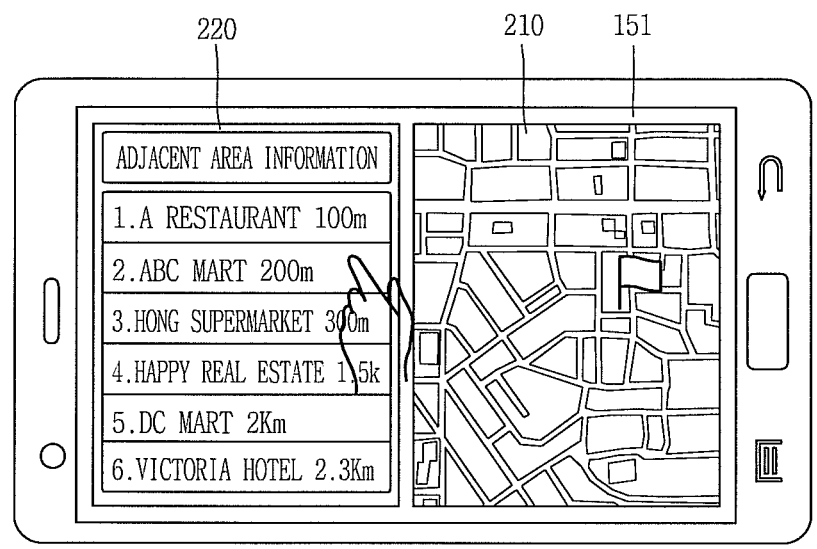
FIGS. 5A and 5B are overviews showing a cooperative relation between display windows in the mobile terminal in accordance with the one exemplary embodiment.
Figure 5A:
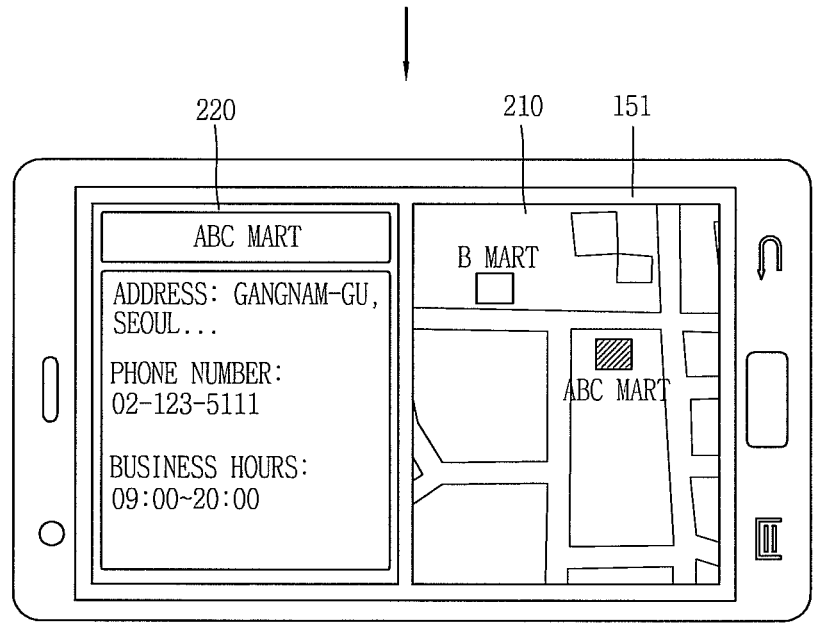
Figure 5B:
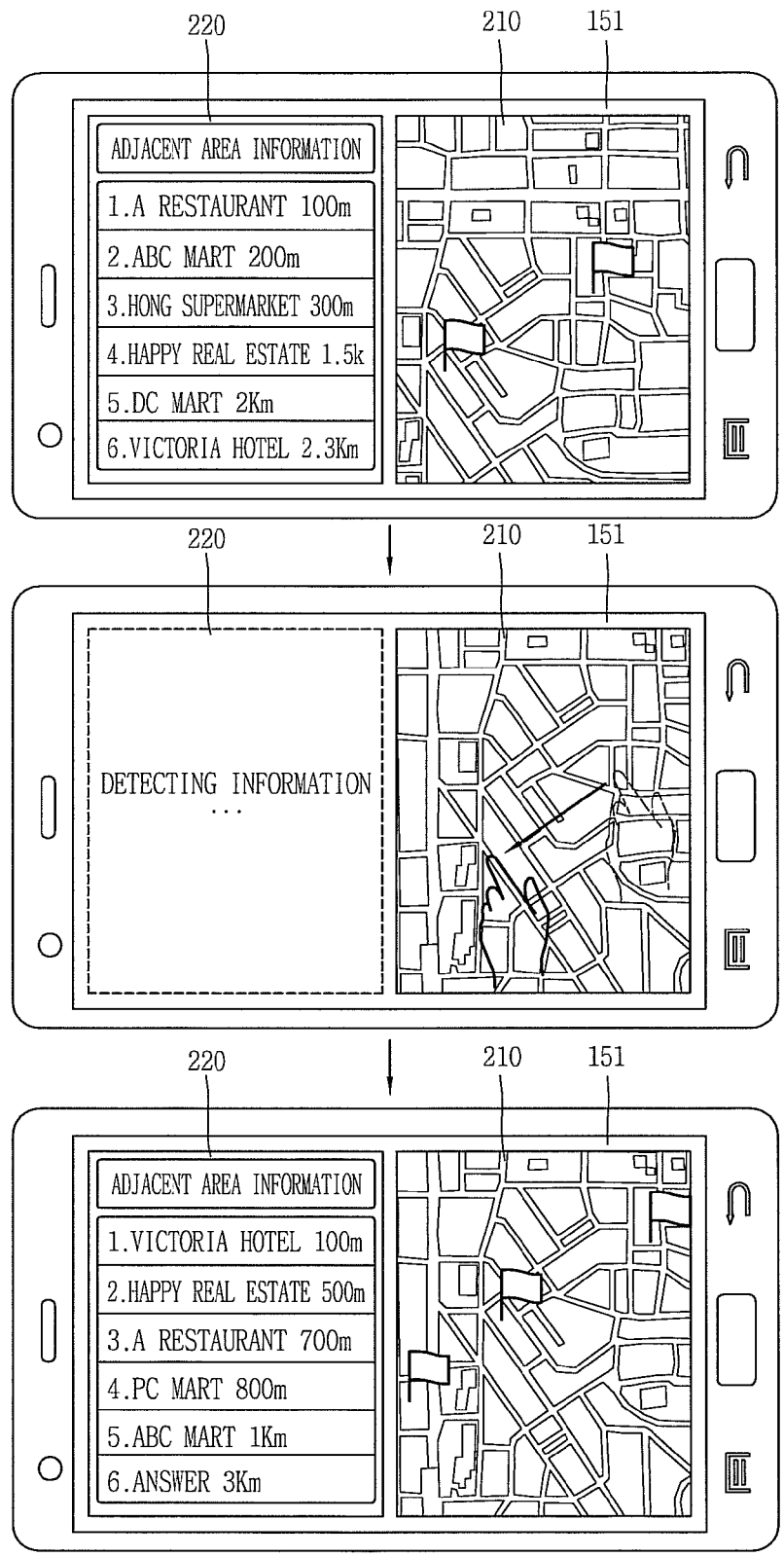

FIGS. 5A and 5B are overviews showing a cooperative relation between display windows in the mobile terminal in accordance with the one exemplary embodiment.

According to the mobile terminal and a control method thereof, as aforementioned, a display window may be generated and information related to an object selected by a user may be displayed on the generated display window.

In addition, the controller 180 may control the display window which has been generated in response to the selection of the object, namely, the second display window to be cooperative with the first display window, which was being displayed on the display unit 151.

For example, when one of information displayed on the second display window 220 is selected by a user, then the controller 180 may change a screen of the first display window 210 so that contents associated with the information selected on the second display window 220 can be displayed on the first display window 210.

That is, the controller 180 may update the second display window 220 in cooperation with a control command input on the first display window 210, or update the first display window 210 in cooperation to a control command input on the second display window 220.

Referring to FIG. 5A, as a user selects an object, a list of adjacent area information, which are information related to an area selected on the first display window 210, may be displayed on the second display window 220.

Next, when a user selects one area information from the list of area information displayed on the second display window 220, the controller 180 may display detailed information selected by the user on the second display window 220 and update the first display window 210 so as to display information related to the selected area information.

Hence, the second display window 220 may display detailed information related to 'ABC mart' selected by the user, and the first display window 210 may be updated to display a detailed map indicating the detailed area information associated with the 'ABC mart.'

Referring to FIG. 5B, the second display window 220 may display a list of information as associated information with an area object selected on the first display window 210. When the selection of the area object changes or the map is moved on the first display window 210 in response to the user's selection, then the controller 180 may update the second display window 220 based on the change or movement on the first display window 210.

That is, in order for the second display window 220 to display information with the highest association with the map displayed on the first display window 210 or the selected object, the detector 181 may newly detect information in response to the change in the displaying on the first display window 210.

As such, according to the mobile terminal and the control method thereof, a previously displayed display window and a newly generated display window can work cooperatively so as to allow conversion of information displayed. This may result in continuously updating of new information on a plurality of display window.

Hereinafter, description will be given of a method for generating a display window in response to selection of information.

FIGS. 6A to 6D are overviews showing a method for generating a display window in a mobile terminal in accordance with one exemplary embodiment.

As shown in the drawings, the controller 180 according to the present disclosure may generate the second display window 220 in response to a user selecting at least one of objects displayed on the first display window 210. Also, the controller 180 may control the detector 181 to detect information associated with the user-selected object. The detected information may be displayed on the second display window 220.

To generate the second display window 220 in the present disclosure, various types of touch input, such as sliding type, flicking type, dragging type and the like, may be used.

Figure 6A:
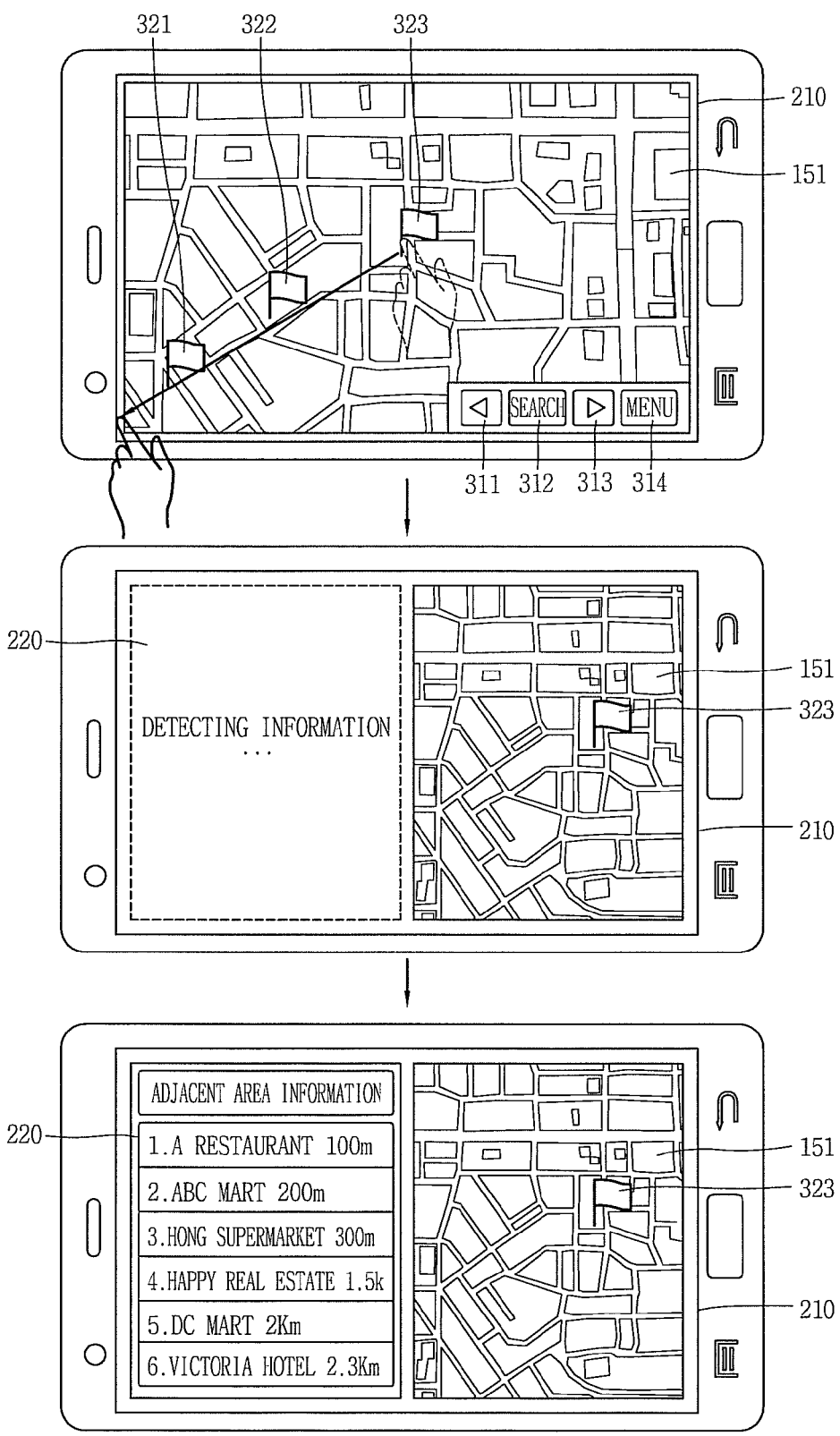
FIGS. 6A to 6D are overviews showing a method for generating a display window in a mobile terminal in accordance with one exemplary embodiment.

For example, as shown in FIG. 6A, when a touch input is detected with respect to the area object 323, which has been selected by the user from the objects displayed on the first display window 210 and then a dragging, flicking or sliding touch input more than a preset range is detected consecutive to the detected touch input, the controller 180 may generate the second display window 220. Also, the detector 181 may detect information associated with the area object 323 in response to the sliding touch input on the area object 323.

As aforementioned, the controller 180 may be able to recognize the sliding, flicking or dragging touch input, which is fully different from a typical touch input, such as single touch or double touch, as a control command for generating the second display window 220.

Also, a dragging range (length) for generating the second display window 220 may variously change depending on settings of a user or the controller 180. As one example, when the dragging input is detected up to a point outside the first display window 210, it may be recognized as an input for generating the second display window 220.

The generated display window may be generated on an area corresponding to the dragging direction input on the first display window.

Figure 6B:
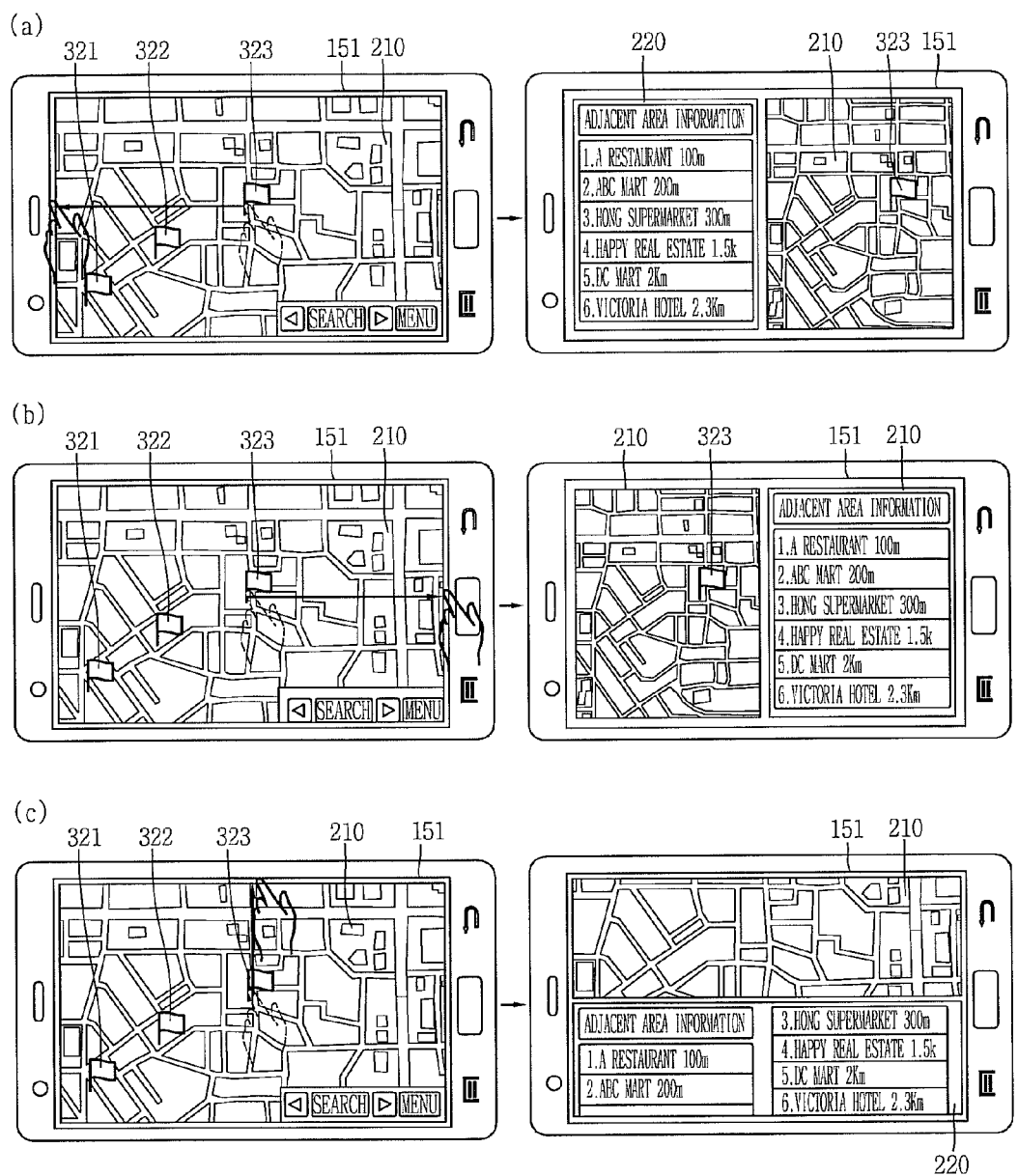

For example, referring to FIG. 6B-(A), when a dragging input toward a left side on the first display window 210 is detected, the controller 180 may detect the direction of the dragging input being applied and generate the second display window 220 in correspondence with the detected direction. Accordingly, the second display window 220 may be generated on the left side of the first display window 210.

Figure 6C:
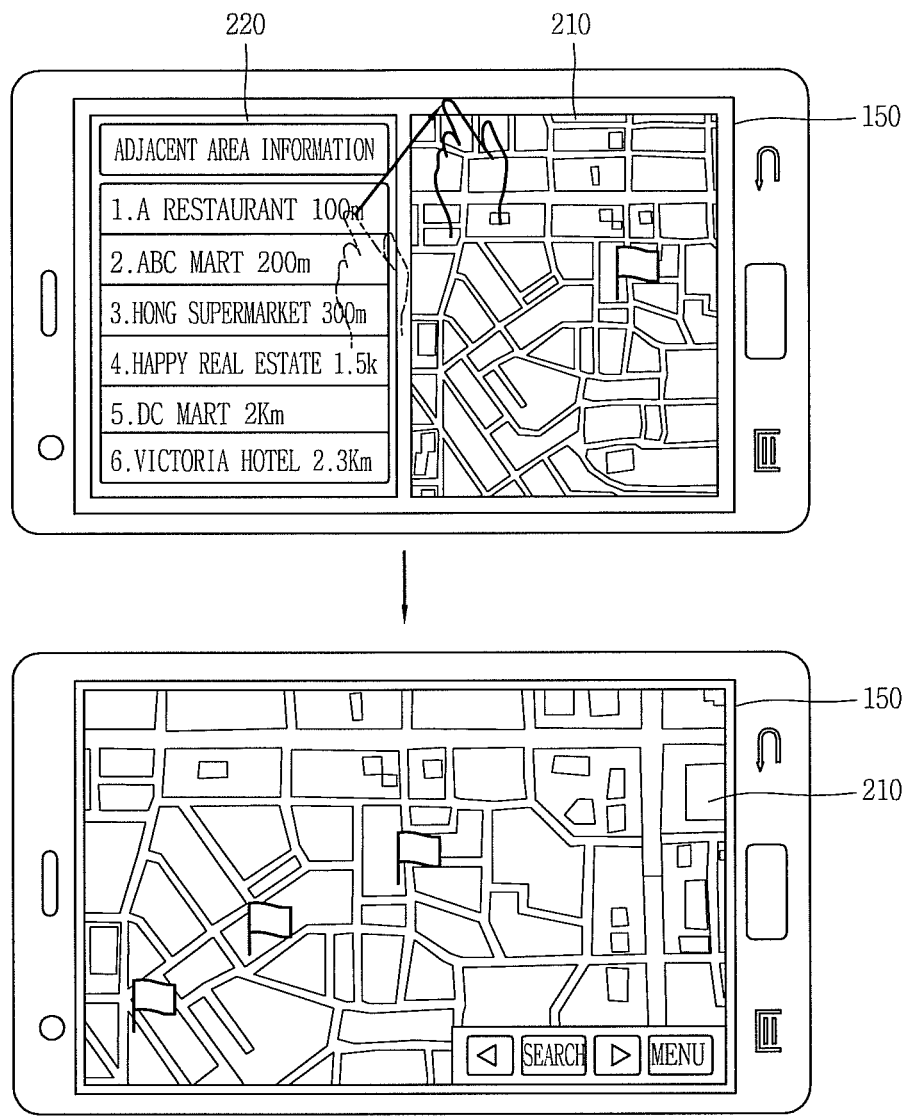

Referring to FIG. 6B-(B), when the dragging input toward a right side on the first display window 210 is detected, the second display window 220 may be generated on a right side of the first display window 210. Referring to FIG. 6B-(C), when the dragging input toward a top on the first display window 210 is detected, the second display window 220 may be generated on an upper portion of the first display window 210.

Thus, the user may differ a dragging direction so as to generate a new display window in a desired direction (position).

Also, similar to generating the second display window 220 through the dragging input, the generated second display window 220 may be deletable (removable) using the dragging input.

For example, referring to FIG. 6C, when the user drags the second display window 220 by more than a preset range, the controller 180 may display only the first display window 210 with making the second display window 220 invisible.

Here, the controller 180 may adjust the size of the first display window 210 to correspond to the size of the display unit 151 and adjust sizes of the objects displayed on the first display window 210.

Here, the dragging range (length) for deleting the second display window 220 may variously change depending on settings of the user and the controller 180. As one example, only when the dragging input is detected up to a point outside the second display window 220, the input may be recognized as an input for deleting (disappearing) the second display window 220.

Figure 6D:
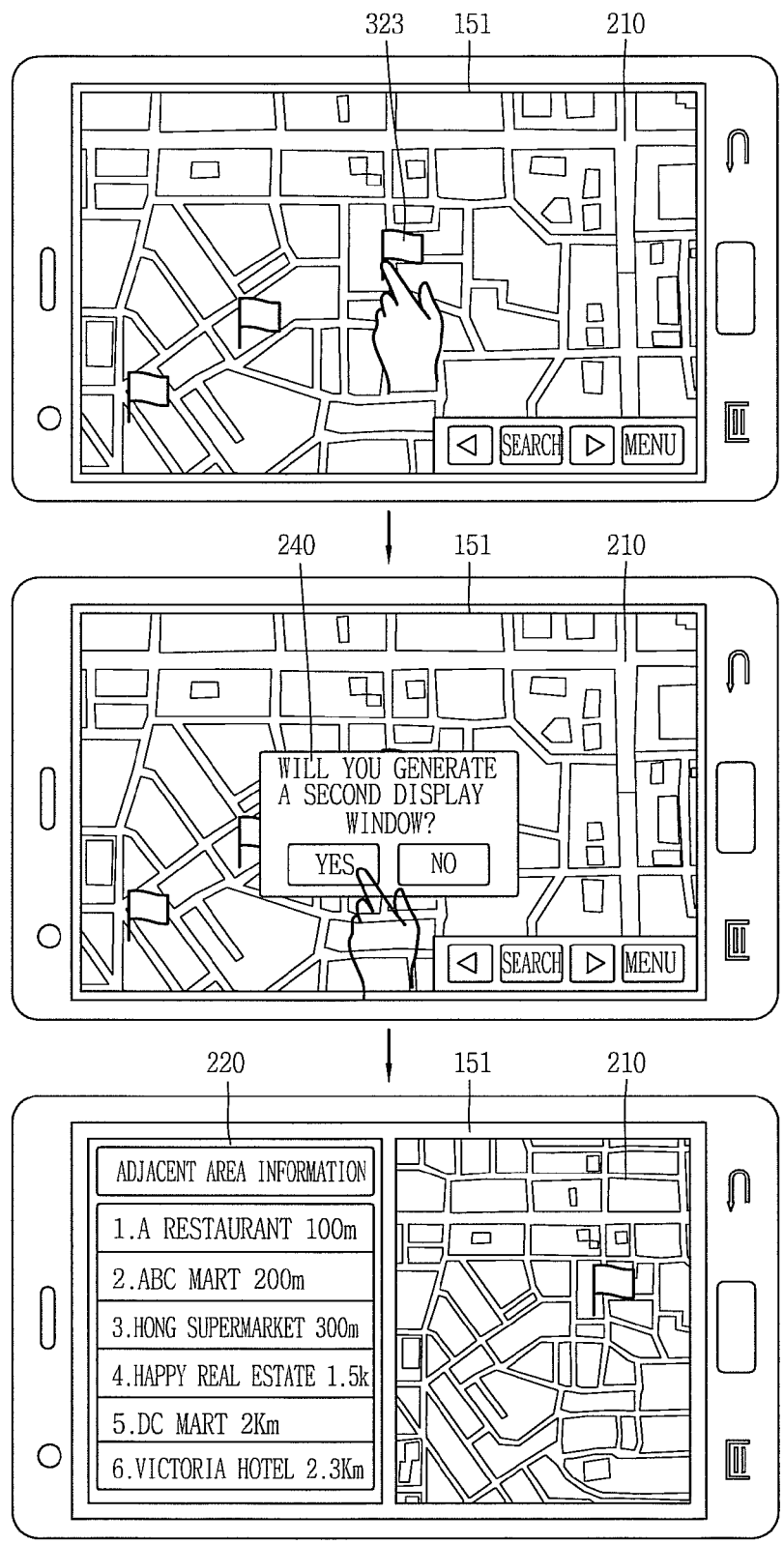

For example, as shown in FIG. 6D, when at least one of objects displayed on the first display window 210 is generated by the user and information has been detected in association with the generated object, the controller 180 may output a select window 240 to check whether the user desires to generate the second display window 220.

When the user decides not to generate the second display window 220, the detected information may be displayed on the first display window 210 as well. On the contrary, when the user decides to generate the second display window 220, the detected information may be displayed on the second display window 220, separate from the first display window 210.

Also, when there is no detected information in association with the selected object on the first display window 210, the controller 180 may not generate the second display window 220 in spite of the user's selection of the object.

As described above, according to the mobile terminal and the control method thereof, a display window may be generated based on various touch input directions, thereby outputting information on a user-desired position.

Hereinafter, description will be given of a method for using a control window to efficiently control a plurality of display windows, with reference to FIGS. 7A to 7C.

Figure 7A:
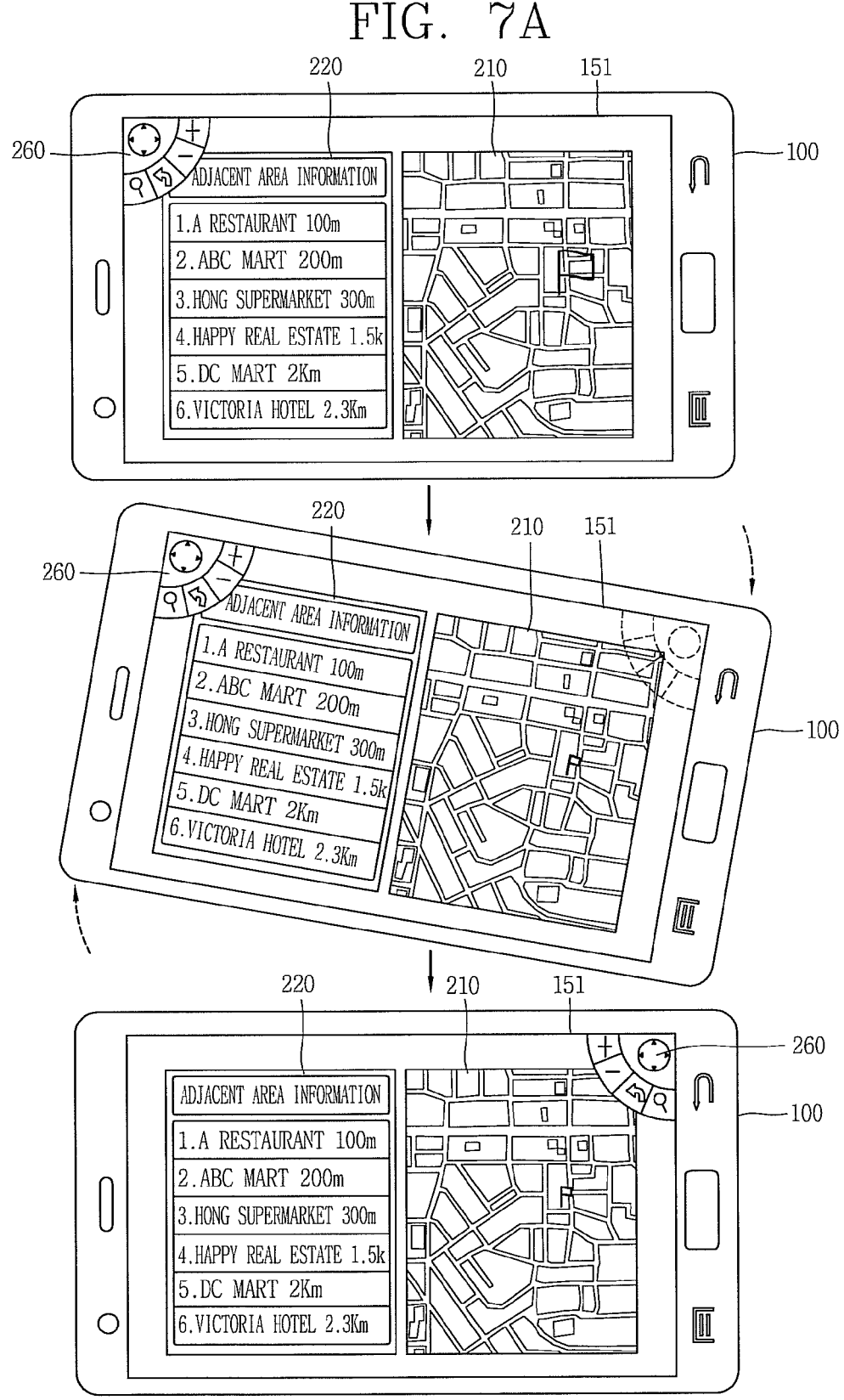
FIGS. 7A to 7C are overviews for explaining a control window in a mobile terminal in accordance with one exemplary embodiment.
Figure 7B:
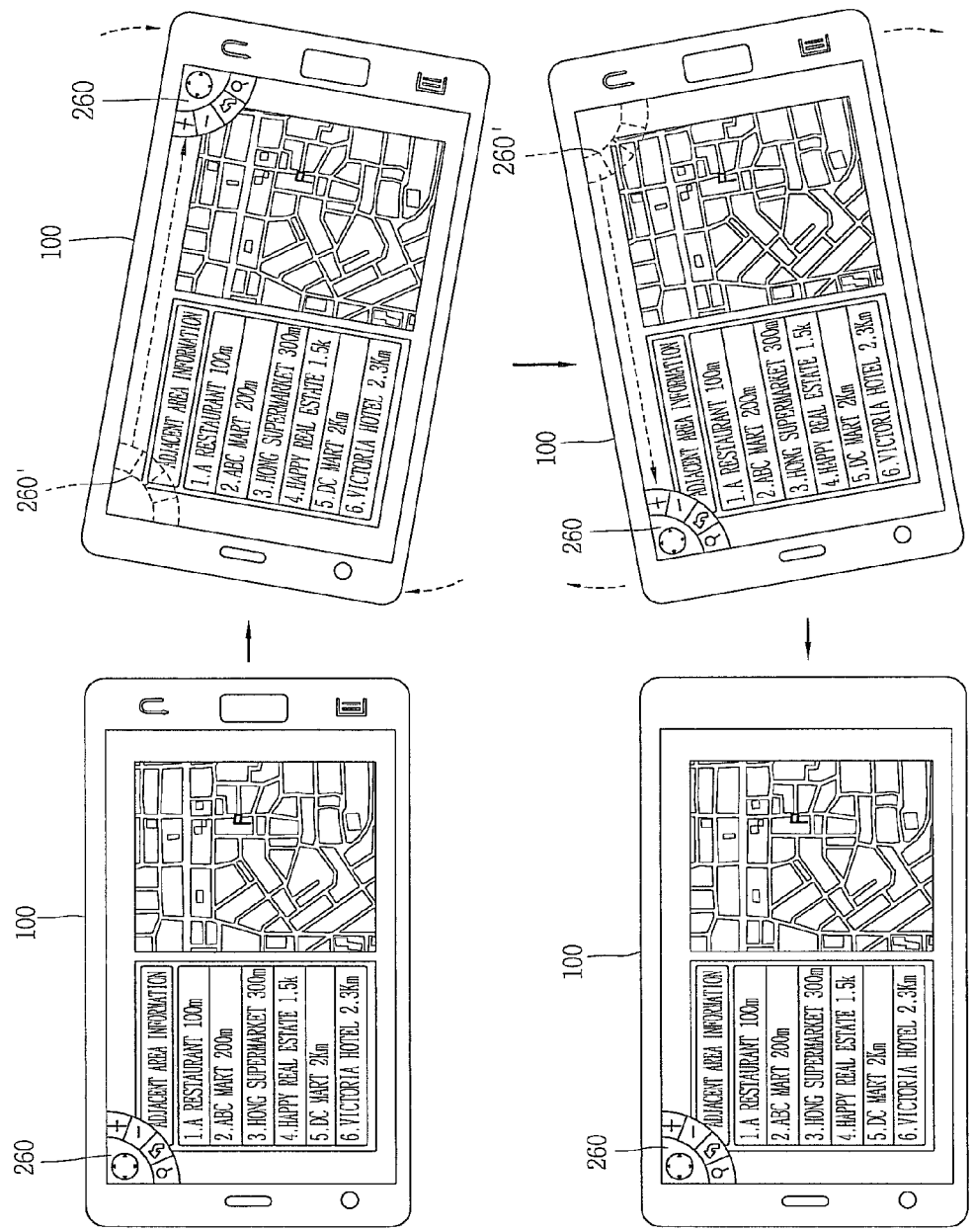
Figure 7C:
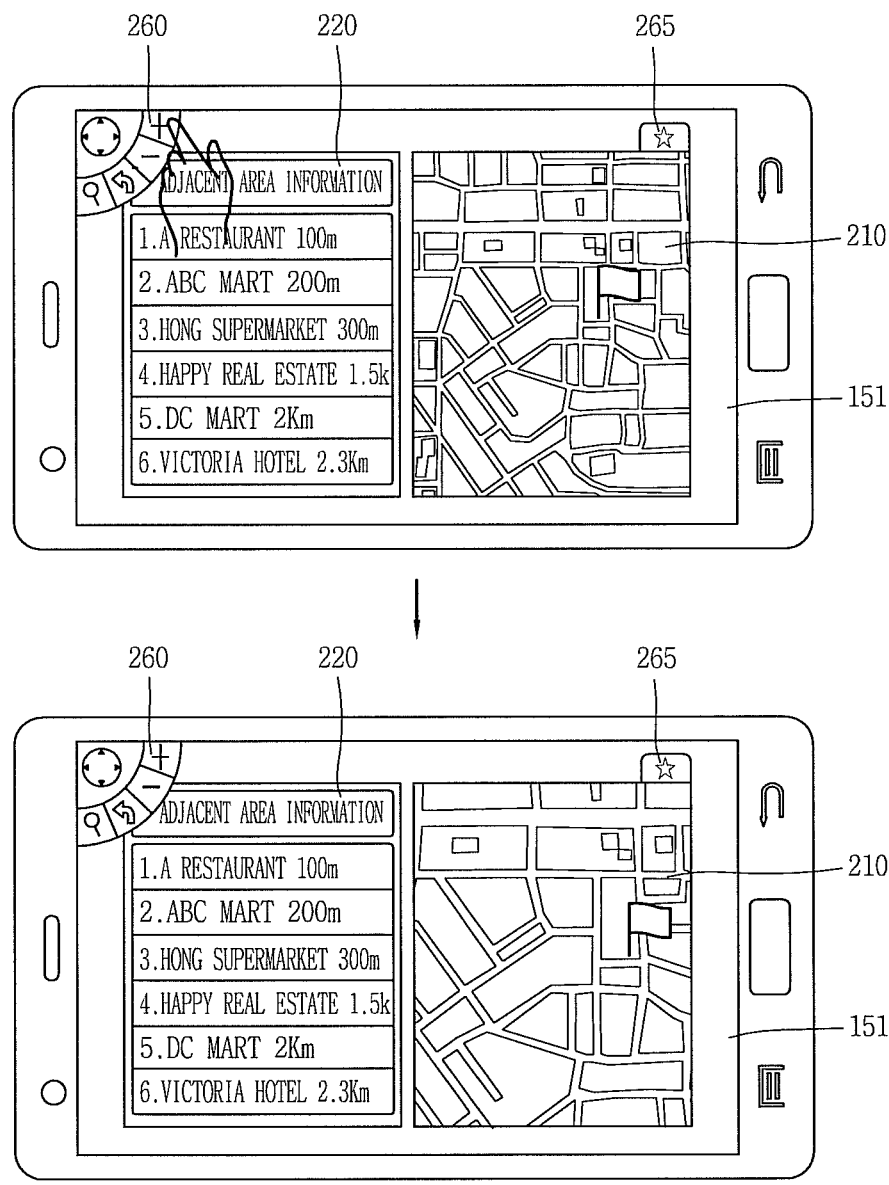

FIGS. 7A to 7C are overviews for explaining a control window in a mobile terminal in accordance with one exemplary embodiment.

According to the mobile terminal and the control method thereof, the second display window 220 may be generated in response to the user selecting at least one of objects displayed on the first display window 210.

The controller 180 may display a control window 260 for controlling at least one of the first and second display windows 210 and 220 on one area on the display unit 151.

The control window 260 may be displayed on the display unit 151 to allow a user to input a control command. The control window 260 may be represented as a virtual key.

Here, the control window 260 may allow a user to input a control command for controlling at least one of the first and second display windows 210 and 220.

The control command may be input to convert, extend or reduce a screen of each display window, retrieve specific data on each screen, or perform various functions such as mail attaching, mail sending and the like.

Also, the control command input on the control window 260 may be recognized as a command for controlling a display window, on which the last control command has been input, of the first and second display windows 210 and 220.

The control window 260 may be used as a navigation key and a select key for controlling at least one of the first and second display windows 210 and 220. For example, the control window 260 may play a role like 'mouse or mouse pad' for controlling the first or second display window 210 or 220.

Also, when the control window 260 is used as the mouse pad, a mark such as a mouse cursor may be displayed on the first or second display window 210 or 220 to indicate a current control position.

The controller 180 may detect an orientation that the terminal 100 is inclined using an operation detecting sensor of the sensing unit 140, and set an area for displaying the control window 260 using the inclination of the terminal 100.

That is, the controller 180 may display the control window 260 on an area corresponding to the orientation of the terminal 100 being inclined. This is perceived from the inclination of the terminal 100 when the user applies a control command with grasping the terminal 100 with a hand. This allows the user to conveniently control the terminal 100 through the control window 260 by using one hand.

For example, as shown in FIG. 7A, the sensing unit 140 may sense an orientation that the terminal is inclined, and the controller 180 may display the control window 260 in the inclined orientation sensed by the sensing unit 140. For example, when the sensing unit 140 senses that the terminal 100 is inclined to right, the controller 180 may display the control window, which was displayed on a left side of the terminal, on the right side according to the inclined orientation.

As shown in FIG. 7B, when an inclined orientation of the terminal 100, namely, the display unit 151 changes, the controller 180 may change an area where the control window 260 is displayed to correspond to the changed orientation sensed by the sensing unit 140.

That is, referring to FIG. 7B, when the terminal 100 is inclined to right, the position of the control window 260 may change from 260' to 260. Then, when terminal 100 is inclined to left, the position of the control window 260 may change from 260' to 260.

In order to inform a user on which display window 210 or 220 a control command currently input on the control window 260 is processed, as shown in FIG. 7C, an icon 265 may be displayed.

For example, an extension command input on the control window 260 shown in FIG. 7 may be applied on the first display window 210, on which the icon 265 is currently displayed, and accordingly, a map displayed on the first display window 210 may be displayed in an extended state.

In addition to the inclination of the terminal 100, the controller 180 may generate the control window 260 based on a touch input detected on the display unit 151, and may set the control window 260 to be displayed only when a preset pattern of touch input is detected.

As described above, according to the mobile terminal and the control method thereof, the control window 260 may be displayed using the inclination of the terminal 100 or the preset touch input, thus to allow the user to manipulate the terminal 100 with one hand.

As so far, it has been illustrated as the main exemplary embodiment that the map is displayed on the first display window 210 and information related to an area selected from the map displayed on the first display window is output on the second display window 220.

Hereinafter, description will be given of various examples to which the present disclosure may be applicable, in addition to the aforementioned map.

FIGS. 8A to 8E are overviews showing examples utilizing a plurality of display windows in a mobile terminal in accordance with one exemplary embodiment.

Figure 8A:
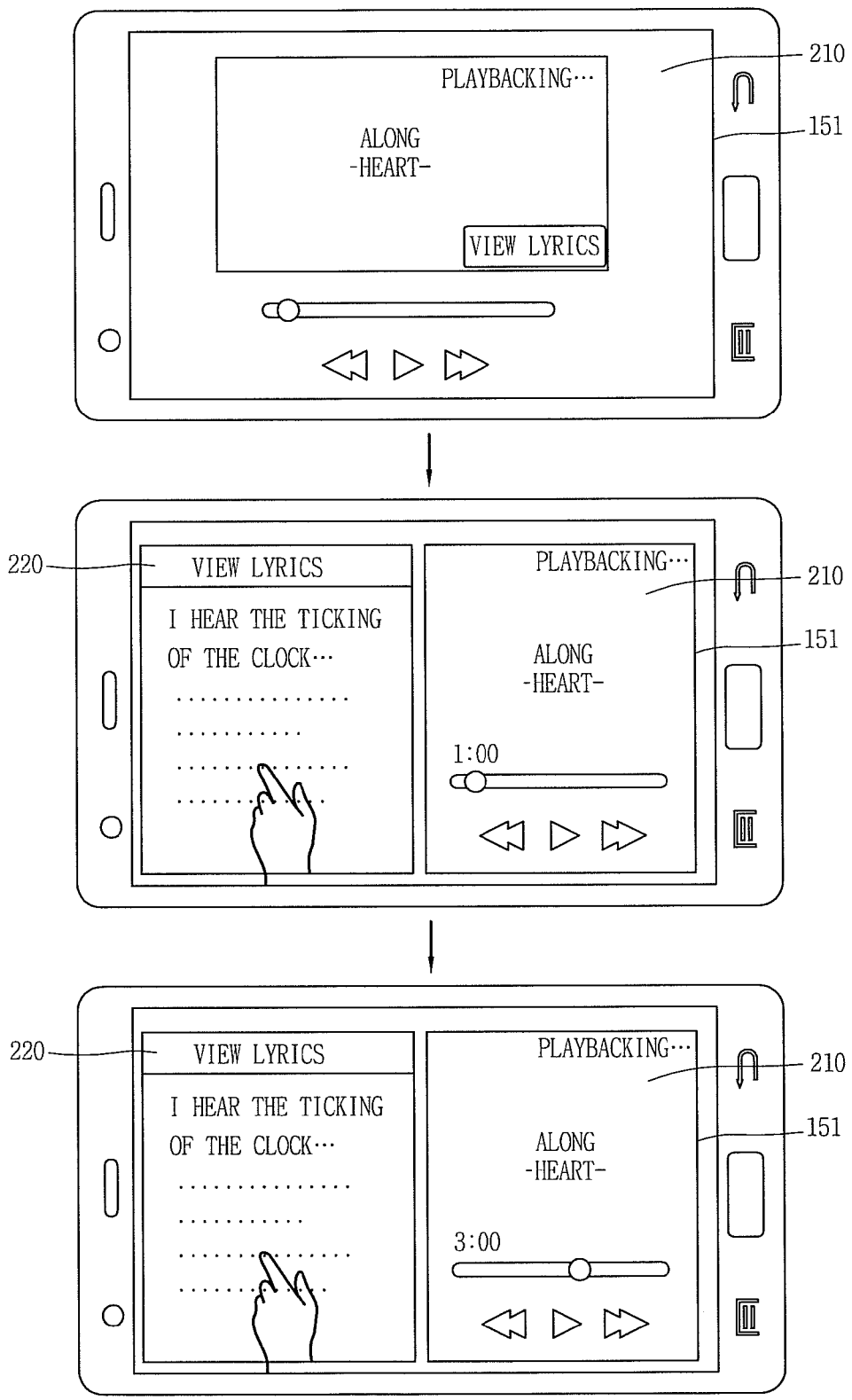
FIGS. 8A to 8E are overviews showing examples utilizing a plurality of display windows in a mobile terminal in accordance with one exemplary embodiment.

First, FIG. 8A shows detecting and displaying associated information while playbacking a music.

For example, while a music playback screen is displayed on the first display window 210, when the user selects an icon 'view lyrics,' the detector 181 may detect lyrics information related to a song being played from the memory 160 or on a website through the wireless communication unit 110.

The controller 180 may generate a second display window 220 to output the lyrics of the song detected by the detector 181 on the generated second display window 220.

When one area of the lyrics of the song displayed on the second display window 220 is selected by the user, the controller 180 may control a portion corresponding to the lyrics included in the selected area to playback on the first display window 210.

Also, the second display window 220 may display a profile of a singer, a music video and the like related to the currently playbacking music (song). As one example, when the song is sung by several singers, if the user selects a specific one of them, the controller 180 may control a portion where the user-selected singer is singing to be played on the first display window 210.

As such, the controller 180 may control display windows associated with the music playback screen to be cooperative with each other.

Figure 8B:
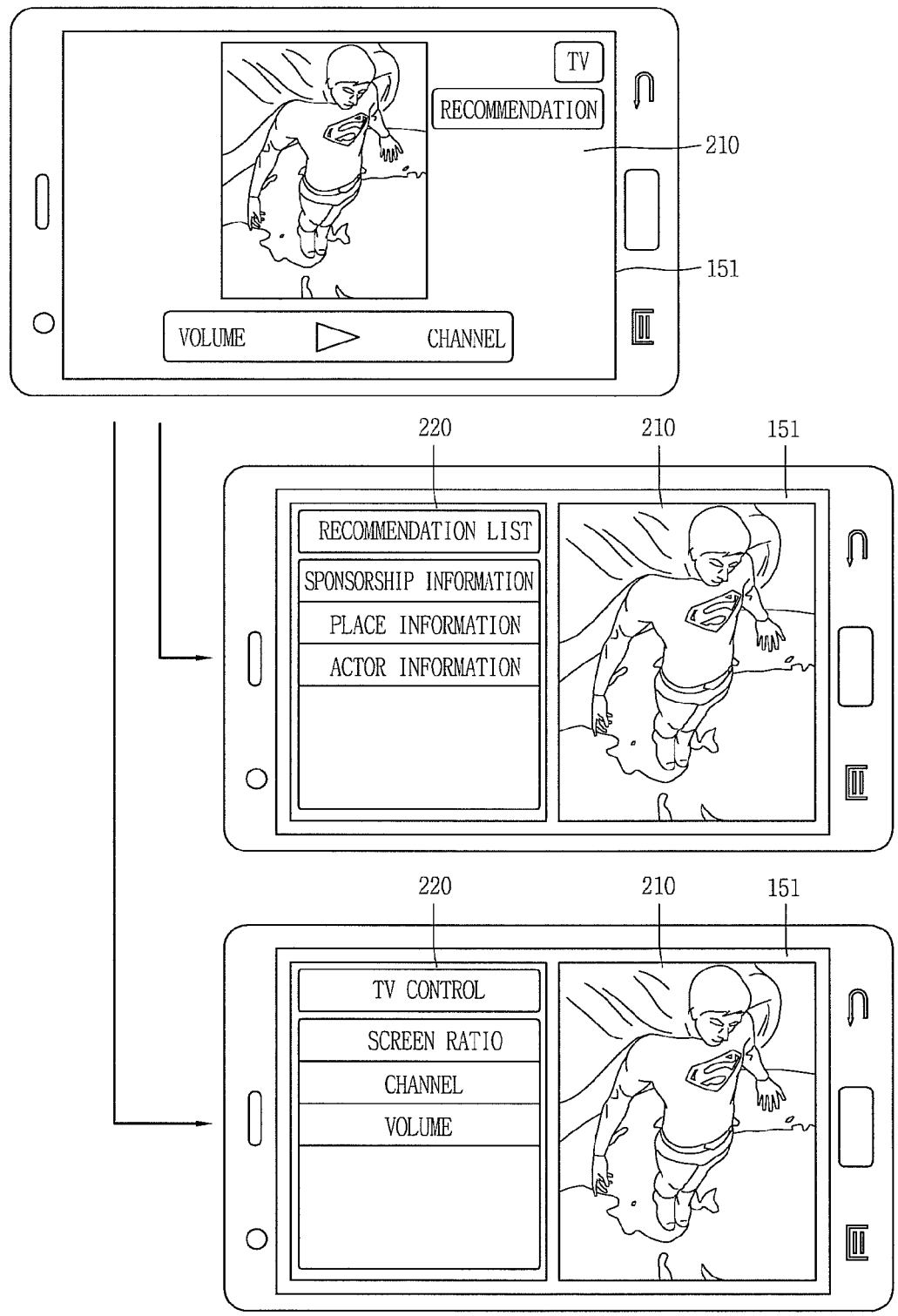

Next, FIG. 8B shows a screen for watching TV according to the present disclosure.

First, the first display window 210 may display a television screen that a user is currently watching. When the user selects an icon of recommendation information or the like while watching the television program on the first display window 210, the controller 180 may generate a second display window 220.

The detector 181 may detect various detectable information, such as sponsorship information, place information, actor information and the like, which are associated with the television program which is being currently watched. The controller 180 may then display the detected information on the second display window 220.

The second display window 220 may also display control function keys for controlling the television screen displayed on the first display window 210, based on a user selection.

The control function keys displayable on the second display window 220 may include a screen scale adjustment, channel adjustment, a volume adjustment, a screen review (time machine function), broadcast information being watched, TV schedule, subtitle, chatting window, a list of recorded images and the like.

Figure 8C:
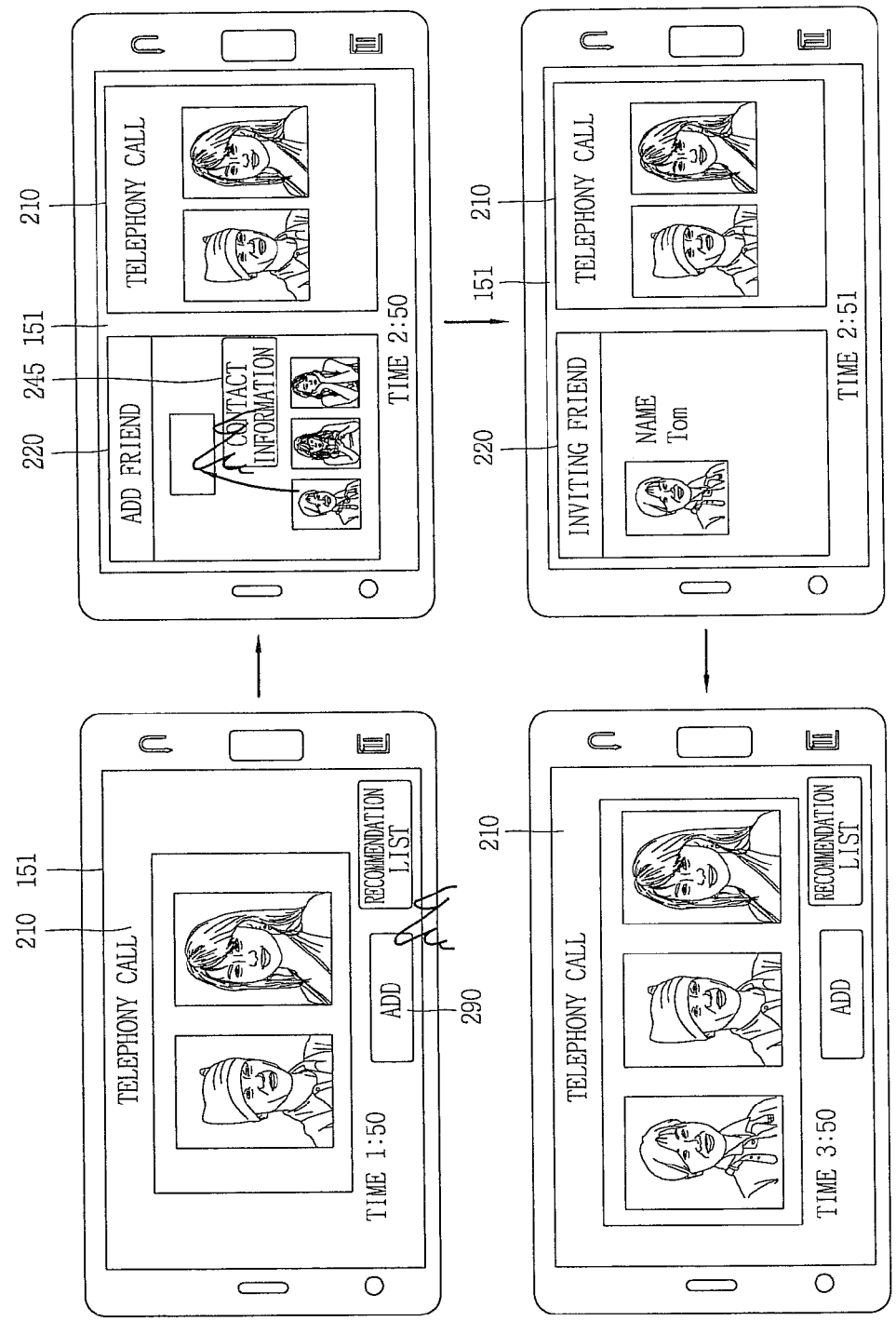

FIG. 8C shows a telephony (video) call screen according to the present disclosure.

First, the first display window 210 may display an image which is output during a telephony call. The image may include a screen for showing a user and a counterpart. When the user selects 'add' icon for adding a person to call (contact) on the first display window 210, the controller 180 may generate the second display window 220.

The detector 181 may retrieve other persons, which are addable to the telephony call, in response to the selection of the 'add' icon, and displays the retrieved results on the second display window 220.

While adding the another person to contact on the second display window 220, the telephony call may be ongoing on the first display window 210.

When the user drags one of the retrieved persons to contact from the second display window 220 to an add window 245, then the controller 180 may invite the dragged person to the telephony call which is ongoing on the first display window 210.

When the selected person to contact accepts the telephony call, the telephony call among the three persons may be carried out on the first display window 210.

Figure 8D:
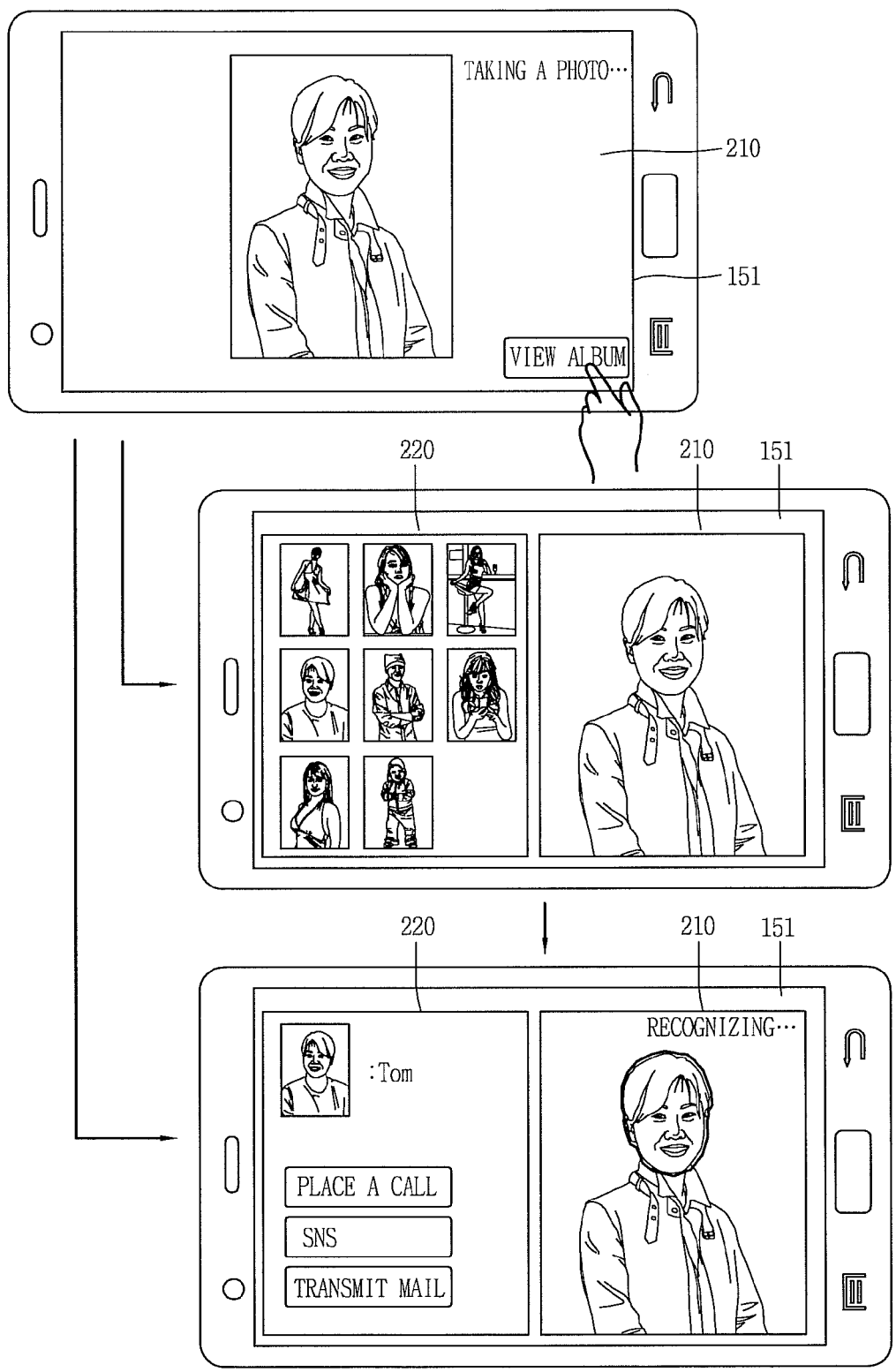

FIG. 8D shows a screen for capturing an image according to the present disclosure.

First, while an image signal input via the camera 121 or 121' (see FIG. 1 and FIGS. 2A and 2B) is output on the first display window 210, when the user selects 'view album' icon, the controller 180 may output images stored in the memory 160 on the second display window 220.

When the user selects a specific face from the image output on the first display window 210, the detector 181 may detect information associated with the user-selected face using a face recognition algorithm.

The controller 180 may then generate the second display window 220, and display the information detected by the detector 181 on the second display window 220.

Also, when the user selects an enlargement of the image output on the first display window 210, the controller 180 may generate the second display window 220 and output the enlarged image on the generated second display window 220. In addition, the controller 180 may capture every image output on the first and second display windows 210 and 220 based on a user selection.

When two or more persons are detected from an image output on the first display window 210, the detector 181 may detect information corresponding to the plurality of persons. The controller 180 may generate the second display window 220, and display information related to each person detected by the detector 181.

As aforementioned, according to the mobile terminal and the control method thereof, when capturing an image, functions associated with the captured image can be executed on a newly generated display window.

Figure 8E:
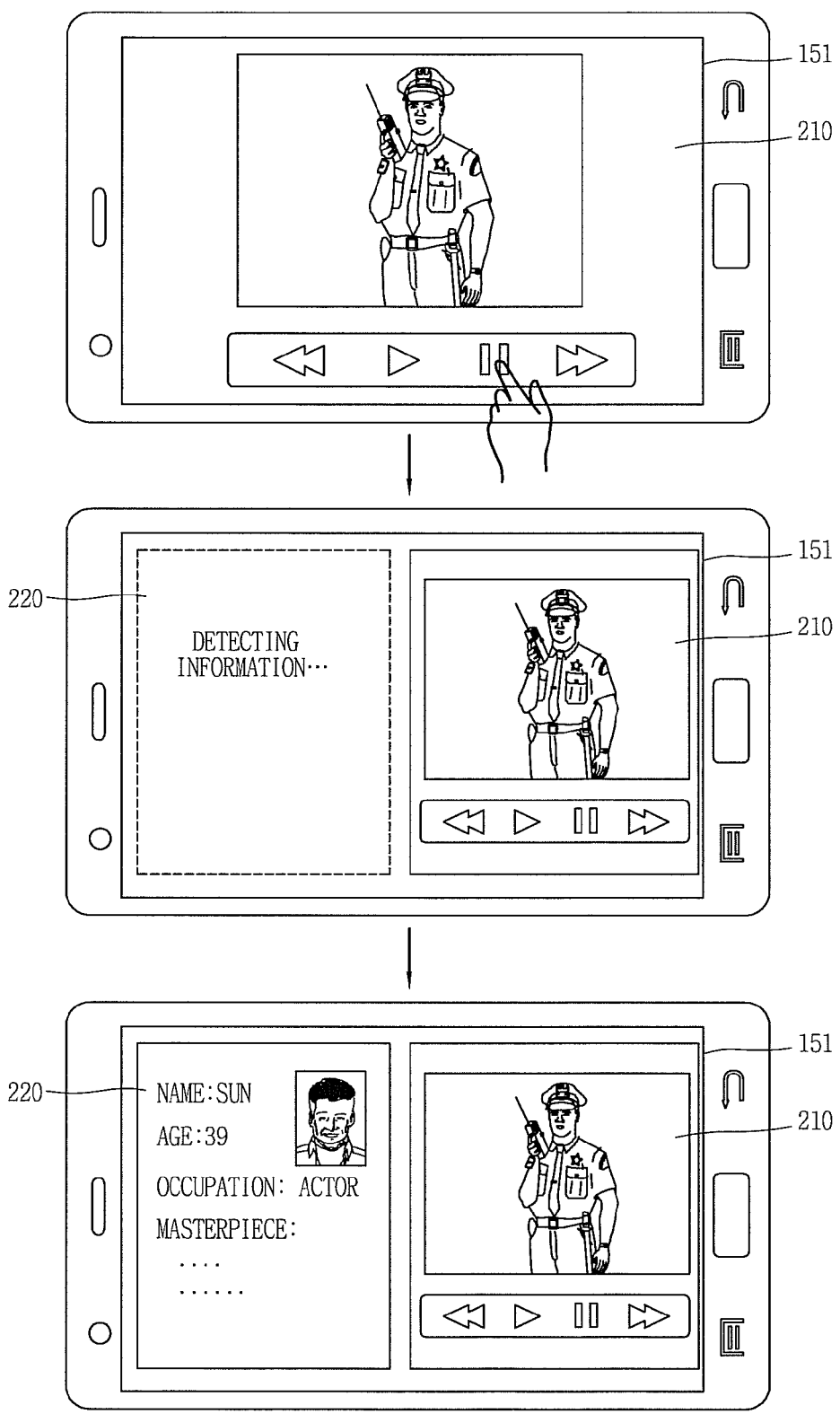

FIG. 8E shows a screen for reproducing a moving image (video) according to the present disclosure.

As shown in FIG. 8E, when the user pauses a video while it is reproduced on the first display window 210, the detector 181 may detect information related to the paused video.

Here, the detected information may be at least one of a place and an area associated with the video, contact information for a person included in the video, a grade of the corresponding video and information related to a product included in the video. Also, other various types of information may be detected.

The controller 180 may generate the second display window 220, and display the information detected by the detector 181 on the second display window 220, thereby efficiently providing the user with the video-associated information.

In addition to those examples, for use of an e-book, the controller 180 may display a picture, a writer's commentary, readers' comments, video, audio file and the like, which are all associated with a content being output on a previously generated display window, on a newly generated display window. Also, the controller 180 may control images to be displayed on a newly generated window, in cooperation with a content displayed on a previously generated window.

As aforementioned, the mobile terminal and the control method thereof may be applicable to various embodiments. Also, information can be provided to a user while updating a plurality of display windows in a cooperative manner, resulting in an efficient provision of information to the user.

Also, according to the mobile terminal and the control method thereof, when a user selects a specific object, data associated with the selected object can be displayed on a separate screen, which allows for providing the user with desired information on one screen without screen conversion.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a sensor to sense an inclination of the mobile terminal;
a touch screen; and
a controller operatively connected to the touch screen, the controller configured to:
receive, via the touch screen, a dragging touch input starting from one of a plurality of objects displayed in a first display window that displays a map, wherein the one of the plurality of objects is related to a specific area of the map and an icon,
determine a direction of the dragging touch input starting from the icon associated with the map displayed in the first display window,
control the touch screen to display a second display window including a list of area information, which is associated with the specific area of the map, on a determined output position corresponding to the direction of the dragging touch input, and to reduce a size of the first display window such that the first display window and the second display window are simultaneously displayed together without overlapping each other, based on the dragging touch input and the direction of the dragging touch input,
wherein the determined output position of the second display window is different according to the direction of the dragging touch input,
wherein the determined output position of the first display window is based on the output position of the second display window determined by the direction of the dragging touch input,
wherein when the dragging touch input is toward a left side on the first display window, the second display window is generated on the left side of the first display window and the first display window is positioned on the right side of the second display window, and
wherein when the dragging touch input is toward a right side on the first display window, the second display window is displayed on the right side of the first display window and the first display window is positioned on the left side of the second display window;
receive a touch input to select one area information from the list of area information displayed on the second display window; and
control the touch screen to display detailed area information associated with the selected one area information on the second display window and to update the first display window to display a detailed map indicating the detailed area information based on the touch input,
wherein the touch screen displays a control window including navigation inputs for controlling the first display window or the second display window,
wherein the controller controls the touch screen to display the control window at a specific area based on the sensed inclination, and
the controller changes the area where the control window is displayed when the sensed inclination of the mobile terminal changes.

2. The mobile terminal of claim 1, wherein in response to selection of information displayed on the second display window, the controller changes the first display window such that at least one content displayed on the first display window is associated with the selected information.

3. The mobile terminal of claim 1, wherein the controller displays the second display window when the dragging input is sensed for more than a preset range out of the First display window.

4. The mobile terminal of claim 3, wherein display of the second display window is removed when a touch input is sensed on the second display window and a dragging input is sensed over a preset range out of the second display window, the dragging input being consecutive to the sensed touch input.

5. The mobile terminal of claim 1, wherein when the size of the first display window changes in response to display of the second display window, sizes of the plurality of objects displayed on the first display window change in cooperation with the change in the size of the first display window.

6. The mobile terminal of claim 1, wherein when the icon associated with the map is selected on the first display window, adjacent area information associated with the selected icon is displayed on the second display window.

7. The mobile terminal of claim 6, wherein the area information includes an address,
wherein when one of the area information displayed on the second display window is selected, the first display window displays a detailed map corresponding to the address included in the selected area information.

8. A method of display on a mobile terminal, the method comprising:
- controlling a touch screen to display a plurality of objects in a first display window included in the touch screen of the mobile terminal, the first display window to display a map having the plurality of objects;
- receiving a dragging touch input starting from one of the plurality of objects displayed in the first display window, wherein the one of the plurality of objects is related to a specific area of the map and an icon;
- determining a direction of the dragging touch input starting from the icon associated with the map displayed in the first display window,
- controlling the touch screen to display a second display window including a list of area information, which is associated with the specific area of the map on a determined output position corresponding to the direction of the dragging touch input, and to reduce a size of the first display window such that the first display window and the second display window are displayed together without overlapping each other, based on the dragging touch input and the direction of the dragging touch input,
- wherein the determined output position of the second display window is different according to the direction of the dragging touch input,
- wherein the determined output position of the first display window is determined based on the output position of the second display window determined by the direction of the dragging touch input,
- wherein when the dragging touch input is toward a left side on the first display window, the second display window is generated on the left side of the first display window and the first display window is positioned on the right side of the second display window, and
- wherein when the dragging touch input is toward a right side on the first display window, the second display window is displayed on the right side of the first display window and the first display window is positioned on the left side of the second display window;
- receiving a touch input to select one area information from the list of area information displayed on the second display window;
- controlling the touch screen to display detailed area information associated with the selected one area information on the second display window and to update the first display window to display a detailed map indicating the detailed area information based on the touch input;
- displaying a control window for controlling the first display window or the second display window, the control window including navigation inputs;
- sensing an inclination of the mobile terminal;
- displaying the control window based on the sensed inclination; and
- changing an area where the control window is displayed when the sensed inclination of the mobile terminal changes.

9. The method of claim 8, wherein in response to receiving selection of information displayed on the second display window, the first display window changes such that at least one content displayed on the first display window is associated with the selected information.

10. The method of claim 8, wherein the second display window is displayed when the dragging input is sensed for more than a preset range out of the first display window.

11. The method of claim 10, wherein display of the second display window is removed when a touch input is sensed on the second display window and a dragging input is sensed over a preset range out of the second display window, the dragging input being consecutive to the sensed touch input.

12. The method of claim 8, wherein when the icon associated with the map is selected on the first display window, adjacent area in Formation associated with the selected object is displayed on the second display window.

* * * * *